(12) United States Patent
Chen et al.

(10) Patent No.: US 8,281,938 B2
(45) Date of Patent: Oct. 9, 2012

(54) NANO-FIBER MATERIAL AND SALT REJECTION FILTRATION MATERIAL

(75) Inventors: Wen-Yi Chen, Kaohsiung County (TW); Shu-Hui Cheng, Hsinchu County (TW); Feng-Hung Tseng, Miaoli County (TW)

(73) Assignee: Industrial Technology Research Institute, Hsinchu County (TW)

( * ) Notice: Subject to any disclaimer, the term of this patent is extended or adjusted under 35 U.S.C. 154(b) by 417 days.

(21) Appl. No.: 12/714,525

(22) Filed: Feb. 28, 2010

(65) Prior Publication Data

US 2010/0219123 A1 Sep. 2, 2010

(30) Foreign Application Priority Data

Mar. 2, 2009 (TW) ................................ 98106638 A

(51) Int. Cl.
*B01D 24/00* (2006.01)
*B01D 39/00* (2006.01)
*H05B 7/00* (2006.01)
*D04H 1/00* (2006.01)
*B01D 61/00* (2006.01)

(52) U.S. Cl. ... 210/504; 210/508; 210/490; 210/500.27; 210/500.28; 210/500.34; 210/500.42; 210/650; 442/351; 442/400; 442/401; 977/902; 977/700; 264/464; 264/484

(58) Field of Classification Search ............... 210/490, 210/650, 500.27, 500.38, 500.23, 500.28, 210/504, 506, 508, 500.34, 500.37; 442/351, 442/400, 401; 977/902, 700; 428/361; 264/464, 264/484
See application file for complete search history.

(56) References Cited

U.S. PATENT DOCUMENTS

| | | | |
|---|---|---|---|
| 4,295,952 A * | 10/1981 | de Nora et al. ............... 204/252 |
| 4,704,324 A | 11/1987 | David et al. | |
| 4,765,897 A | 8/1988 | Cadotte et al. | |
| 4,769,148 A | 9/1988 | Fibiger et al. | |
| 4,812,238 A | 3/1989 | Cadotte et al. | |
| 4,828,700 A | 5/1989 | Fibiger et al. | |
| 4,927,540 A | 5/1990 | Wessling et al. | |
| 4,948,711 A * | 8/1990 | Kojima et al. ............... 430/393 |
| 5,464,538 A | 11/1995 | Schmidt et al. | |
| 5,543,045 A * | 8/1996 | Fukutomi et al. ............ 210/490 |
| 5,755,964 A | 5/1998 | Mickols | |
| 6,562,266 B2 | 5/2003 | Mickols | |
| 7,670,470 B2 * | 3/2010 | Mao et al. ..................... 204/400 |
| 2004/0241436 A1 * | 12/2004 | Hsieh et al. .................. 428/361 |
| 2009/0032475 A1 * | 2/2009 | Ferrer et al. .................. 210/799 |
| 2010/0044289 A1 * | 2/2010 | Koslow .................... 210/167.02 |
| 2011/0210064 A1 * | 9/2011 | Cheng et al. ............ 210/500.29 |
| 2012/0125866 A1 * | 5/2012 | Fantini ......................... 210/767 |

* cited by examiner

*Primary Examiner* — Ana Fortuna
(74) *Attorney, Agent, or Firm* — Pai Patent & Trademark Law Firm; Chao-Chang David Pai

(57) ABSTRACT

The invention discloses a nano-fiber material, wherein the nano-fiber material is formed by spinning an ionic polymer into a nano-fiber nonwoven, and the ionic polymer is represented by the formula:

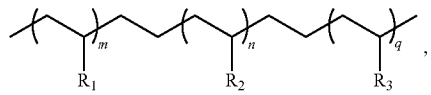

wherein:
$R_1$ includes phenyl sulfonate or alkyl sulfonate; $R_2$ includes

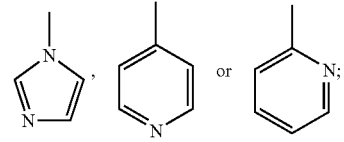

$R_3$ includes

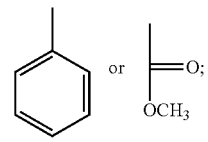

and m/n is between 1/50 and 50/1, $q \geq 0$.

11 Claims, No Drawings

NANO-FIBER MATERIAL AND SALT REJECTION FILTRATION MATERIAL

CROSS REFERENCE TO RELATED APPLICATIONS

This Application claims priority of Taiwan Patent Application No. 98106638, filed on Mar. 2, 2009, the entirety of which is incorporated by reference herein.

BACKGROUND OF THE INVENTION

1. Field of the Invention

The present invention relates to a nano-fiber material, and in particular relates to a salt rejection filtration material.

2. Description of the Related Art

Water treatment has grown in importance recently, as industries continue to expand and global warming becomes more of a problem. Several salt rejection filtration materials which may be used in seawater and wastewater have been developed. The developmental objectives of the materials are to increase salt rejection and water flux.

U.S. Pat. No. 4,828,700 discloses a membrane made of cross-linked poly methyl methacrylate. The membrane has a 9.1 GFD flux, and a 97.9% salt rejection, when tested under an operating pressure of 400 psi using 2500 ppm of salt water.

U.S. Pat. No. 5,755,964 discloses a reverse osmosis (RO) membrane, wherein the RO membrane has good wetting property by using amine compound to treat the surface of the RO membrane. The RO membrane has a 48 GFD flux, when tested under an operating pressure of 225 psi using 2000 ppm of salt water. The RO membrane exhibits high flux like nano-filtration material.

Salt rejection filtration materials are in the form of a membrane in prior art. However, in order to improve flux, the membrane needs to be operated under a high pressure. Meanwhile, fiber has advantages of high surface area, high porosity and low pressure filtration. Accordingly, if a filtration material in the form of a fiber is developed, salt rejection and water flux of filtration material may be increased.

BRIEF SUMMARY OF THE INVENTION

The invention provides a nano-fiber material, wherein the nano-fiber material is formed by spinning an ionic polymer into a nano-fiber nonwoven, and the ionic polymer is represented by the formula:

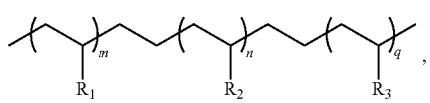

wherein: $R_1$ comprises phenyl sulfonate or alkyl sulfonate; $R_2$ comprises

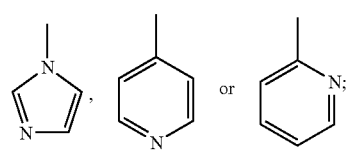

$R_3$ comprises

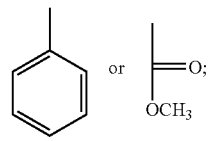

and m/n is between 1/50 and 50/1, $q \geq 0$.

The present invention provides a salt rejection filtration material, wherein the salt rejection filtration material is formed by spinning an ionic polymer into a nano-fiber nonwoven, and the ionic polymer is represented by the formula:

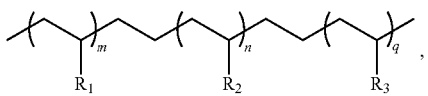

wherein: $R_1$ comprises phenyl sulfonate or alkyl sulfonate; $R_2$ comprises

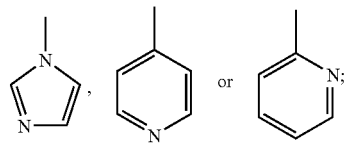

$R_3$ comprises

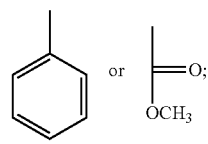

and m/n is between 1/50 and 50/1, $q \geq 0$

A detailed description is given in the following embodiments with reference to the accompanying drawings.

DETAILED DESCRIPTION OF THE INVENTION

The present invention provides a nano-fiber material, wherein the nano-fiber material is formed by spinning an ionic polymer into a nano-fiber nonwoven, and the ionic polymer is represented by the formula:

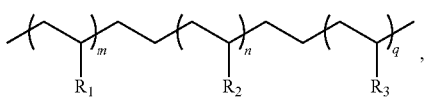

wherein: $R_1$ comprises phenyl sulfonate or alkyl sulfonate; $R_2$ comprises

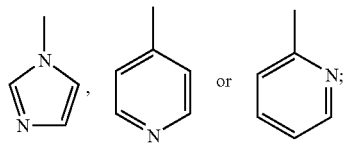

$R_3$ comprises

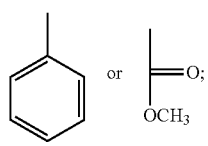

and m/n is between 1/50 and 50/1, $q \geqq 0$.

When salt water is filtered by the nano-fiber material, the ions dissolved in water are repelled by the ions at the $R_1$ group and $R_2$ group of the nano-fiber material due to the electron-repelling effect. Thus, only water molecules pass through the nano-fiber material. When q is larger than 0 (>0), the function of the $R_3$ group of the nano-fiber material is to improve its stability in water. In another embodiment, when q is equal to zero, there is no $R_3$ group in the nano-fiber material.

The nano-fiber material of the invention is formed by spinning an ionic polymer into a nano-fiber nonwoven, wherein the nano-fiber nonwoven also combines with other fibers or resins to form a composite. The nano-fiber material is made by spinning techniques, such as solution spinning or electrospinning. The nano-fiber nonwoven has high surface areas and high ion density to intact with the ions dissolved in water. Thus, repelling effect is increased and salt rejection efficiency is improved.

Furthermore, the nano-fiber nonwoven is obtained by directly spinning the ionic polymer without further modification as in conventional methods.

The nano-fiber nonwoven formed by spinning techniques has a diameter of about 20 nm-700 nm and a weight of about 10-80 g/m². Thus, the nano-fiber material may be applied in various fields, such as salt rejection process, wastewater treatment, ultra-purified water treatment, water softing or heavy metal wastewater recycling.

Additionally, the invention also provides a salt rejection filtration material, wherein the salt rejection filtration material is formed by spinning an ionic polymer into a nonwoven, and the ionic polymer is represented by the formula as presented above.

When seawater or wastewater is desalted by the filtration material of the invention, the ions dissolved (even the smallest ions (e.g. $Na^+$)) in water are repelled by the ions at the $R_1$ group and $R_2$ group of the filtration material due to the electron-repelling effect. Thus, salt in water is removed.

The conventional reverse osmosis (RO) membranes have small pores (smaller than 1 nm). Thus, the membranes must be operated under a pressure which is larger than about 800 psi, even 1000 psi. The main advantage of the invention is that the salt rejection filtration material of the invention can exhibit high flux as with the conventional RO membrane, but may be operated under a lower pressure environment. Flux of the salt rejection filtration material of the invention is 18-90 L/m²/hr flux, and salt rejection rate is 60%-90%, when tested under an operating pressure smaller than of 10 psi. In order to improve salt rejection efficiency, the salt rejection filtration material of the invention may be arranged in series without increasing operating pressure.

The following description is of the best-contemplated mode of carrying out the invention. This description is made for the purpose of illustrating the general principles of the invention and should not be taken in a limiting sense. The scope of the invention is best determined by reference to the appended claims.

EXAMPLE

Example 1

10 g of sodium styrenesulfate, 40 g of 4-vinyl pyridine, 10 g of styrene, 50 g of deionized water and 50 g of isopropanol (IPA) were dissolved in a reaction flask, and stirred under an $N_2$ atmosphere at 70° C. A solution containing 0.2 g of potassium persulfate (KPS) in 10 mL of deionized water was slowly added into the reaction flask, and kept for 3 hours. The mixture was dipped into a 1%-3% sodium chloride (NaCl) solution for purification. After purification, 49.8 g of a polymer was obtained. (83%)

Example 2

10 g of sodium styrenesulfate, 20 g of 4-vinyl pyridine, 10 g of styrene, 50 g of deionized water and 50 g of isopropanol (IPA) were dissolved in a reaction flask, and stirred under an $N_2$ atmosphere at 70° C. A solution containing 0.2 g of potassium persulfate (KPS) in 10 mL of deionized water was slowly added into the reaction flask, and kept for 3 hours. The mixture was dipped into a 1%-3% sodium chloride (NaCl) solution for purification. After purification, 36 g of a polymer was obtained. (90%)

Example 3

10 g of sodium styrenesulfate, 40 g of 4-vinyl pyridine, 7 g of styrene, 50 g of deionized water and 50 g of isopropanol (IPA) were dissolved in a reaction flask, and stirred under an $N_2$ atmosphere at 70° C. A solution containing 0.2 g of potassium persulfate (KPS) in 10 mL of deionized water was slowly added into the reaction flask, and kept for 3 hours. The mixture was dipped into a 1%-3% sodium chloride (NaCl) solution for purification. After purification, 50.1 g of a polymer was obtained. (88%)

Example 4

36 g of the polymer of Example 1 was dissolved in 200 g of N,N-dimethyl-acetamide (DMAc) to provide a spinning solution. The nano-fiber material was deposited on a weight of 70 g/m² PET (polyethylene terephthalate) non-woven fabric by electrospinning, with an applied voltage of 39 KV, spray amount of 1200 μL/min, a 20 cm distance between the collector and spinneret, and air pressure of 5 kg/cm³. A composite nano-fiber filtration material with a diameter of 85 nm-135 nm and weight of 88 g/m² was obtained.

Example 5

36 g of the polymer of Example 2 was dissolved in 200 g of N,N-dimethyl-acetamide (DMAc) to provide a spinning solution. The nano-fiber material was deposited on a weight of 70 g/m² PET (polyethylene terephthalate) non-woven fabric by electrospinning, with an applied voltage of 39 KV, spray amount of 1200 μL/min, a 20 cm distance between the collector and spinneret, and air pressure of 5 kg/cm³. A composite nano-fiber filtration material with a diameter of 75 nm-175 nm and weight of 95 g/m² was obtained.

Example 6

36 g of the polymer of Example 3 was dissolved in 200 g of N,N-dimethyl-acetamide (DMAc) to provide a spinning solution. The nano-fiber material was deposited on a weight of 70 g/m² PET (polyethylene terephthalate) non-woven fabric by electrospinning, with an applied voltage of 39 KV, spray amount of 1200 μL/min, a 20 cm distance between the collector and spinneret, and air pressure of 5 kg/cm³. A composite nano-fiber filtration material with a diameter of 70 nm-120 nm and weight of 94 g/m² was obtained.

Example 7, 8, 9

The nano-fiber composite of Example 4, 5 and 6 were tested in water containing 32000 ppm salt, as shown in Table 1.

Comparative Example 1

A commercially available filtration material Filmett (SW30HR-380) was tested in water containing 32000 ppm salt, as shown in Table 1. Referring to Table 1, the flux of the nano-fiber filtration material of Example 7, 8 and 9 were all larger than 18 L/m²/hr, and the largest value is about 121 L/m²/hr. The pressure of Example 7, 8 and 9 was lower than 10 psi, more specifically, lower than that of the Comparative Example 1. Additionally, the salt rejection of Example 7, 8 and 9 was about 60%-90%.

TABLE 1

|  | Example 7 | Example 8 | Example 9 | Comparative Example 1 |
| --- | --- | --- | --- | --- |
| flux (L/m²/hr) | 121 | 76 | 25 | 30 |
| pressure (psi) | 3 | 1 | 1 | 860 |
| salt rejection (%) | 80.6 | 85.4 | 90.5 | 83.6 |

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A nano-fiber material, wherein the nano-fiber material is formed by spinning an ionic polymer into a nano-fiber nonwoven, and the ionic polymer is represented by the formula:

wherein:

$R_1$ comprises phenyl sulfonate or alkyl sulfonate;

$R_2$ comprises $R_3$ comprises and m/n is between 1/50 and 50/1, $q \geq 0$.

2. The nano-fiber material as claimed in claim 1, wherein $q > 0$.

3. The nano-fiber material as claimed in claim 1, wherein $q = 0$.

4. The nano-fiber material as claimed in claim 1, wherein the nano-fiber nonwoven has a diameter of about 20 nm-700 nm.

5. The nano-fiber material as claimed in claim 4, wherein the nano-fiber material is made by solution spinning or electrospinning.

6. The nano-fiber material as claimed in claim 4, wherein the nano-fiber material is applied in salt rejection processes, wastewater treatment, ultra-purified water treatment, water softing or heavy metal wastewater recycling.

7. A salt rejection filtration material, wherein the salt rejection filtration material is formed by spinning an ionic polymer into a nano-fiber nonwoven, and the ionic polymer is represented by the formula:

wherein:

$R_1$ comprises phenyl sulfonate or alkyl sulfonate;

$R_2$ comprises

R₃ comprises 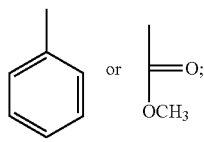 and m/n is between 1/50 and 50/1, $q \geqq 0$.

8. The salt rejection filtration material as claimed in claim 7, wherein $q>0$.

9. The salt rejection filtration material as claimed in claim 7, wherein $q=0$.

10. The salt rejection filtration material as claimed in claim 7, wherein the nano-fiber nonwoven has a diameter of about 20 nm-700 nm.

11. The salt rejection filtration material as claimed in claim 7, wherein the nano-fiber material is made by solution spinning or electrospinning.

* * * * *